(12) United States Patent
Simon et al.

(10) Patent No.: US 10,432,774 B2
(45) Date of Patent: Oct. 1, 2019

(54) PERSONAL ALARM SYSTEM AND METHOD

(71) Applicant: Sfara Inc., Hoboken, NJ (US)

(72) Inventors: Sascha Simon, Warwick, NY (US); James Rocco Tricarico, II, Richmond, VA (US)

(73) Assignee: Sfara, Inc., Hoboken, NJ (US)

( * ) Notice: Subject to any disclaimer, the term of this patent is extended or adjusted under 35 U.S.C. 154(b) by 0 days.

(21) Appl. No.: 15/828,760

(22) Filed: Dec. 1, 2017

(65) Prior Publication Data

US 2019/0173992 A1  Jun. 6, 2019

(51) Int. Cl.
| | |
|---|---|
| *G08B 23/00* | (2006.01) |
| *H04M 1/725* | (2006.01) |
| *G08B 25/01* | (2006.01) |
| *G08B 25/00* | (2006.01) |
| *H04W 4/02* | (2018.01) |

(52) U.S. Cl.
CPC ...... *H04M 1/72538* (2013.01); *G08B 25/001* (2013.01); *G08B 25/008* (2013.01); *G08B 25/016* (2013.01); *H04W 4/027* (2013.01)

(58) Field of Classification Search
CPC .... G08B 25/016; G08B 25/001; G08B 23/00; H04M 11/04
See application file for complete search history.

(56) References Cited

U.S. PATENT DOCUMENTS

| | | | | |
|---|---|---|---|---|
| 9,454,889 | B2 * | 9/2016 | Kerning | ............... H04W 4/90 |
| 10,055,803 | B2 * | 8/2018 | Orduna | ............... G06Q 50/265 |
| 2013/0231077 | A1 * | 9/2013 | Cahill | ............... G08B 25/008 |
| | | | | 455/404.2 |
| 2018/0012460 | A1 * | 1/2018 | Heitz, III | ......... G08B 13/19656 |

* cited by examiner

*Primary Examiner* — Phung Nguyen

(57) ABSTRACT

A communication device includes an arming component that can generates an arming signal based on arming activation at an arming time, an activation component that can generate an activation signal based on an activation at an activation time, a parameter establishing component that can establish a safety parameter and can generate a safety signal based on a determination of the safety parameter, a communication component that can transmit a data communication, and a disarming component that can generate a disarming signal based on a disarming activation at a disarming time The communication component can transmit the data communication based on the safety signal. The communication component can transmit the data communication based on the activation signal. The communication component can prevent transmission of the data communication based on the disarming signal.

18 Claims, 9 Drawing Sheets

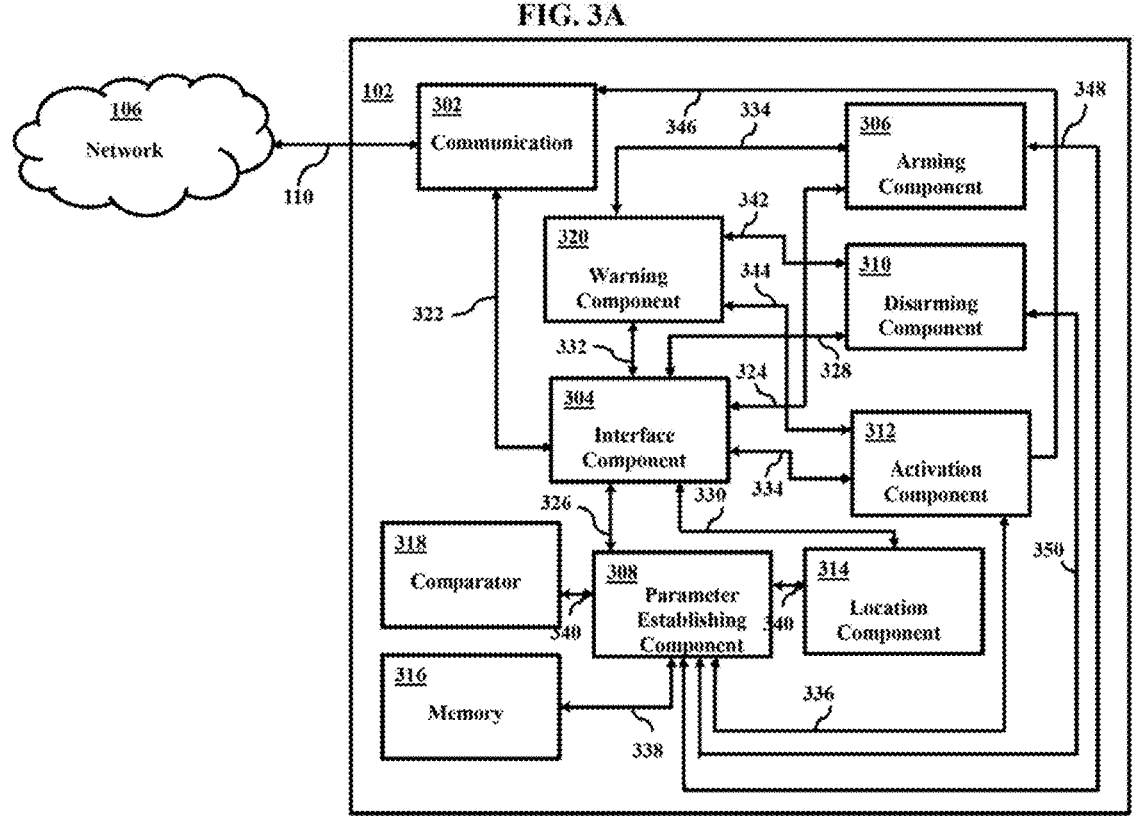

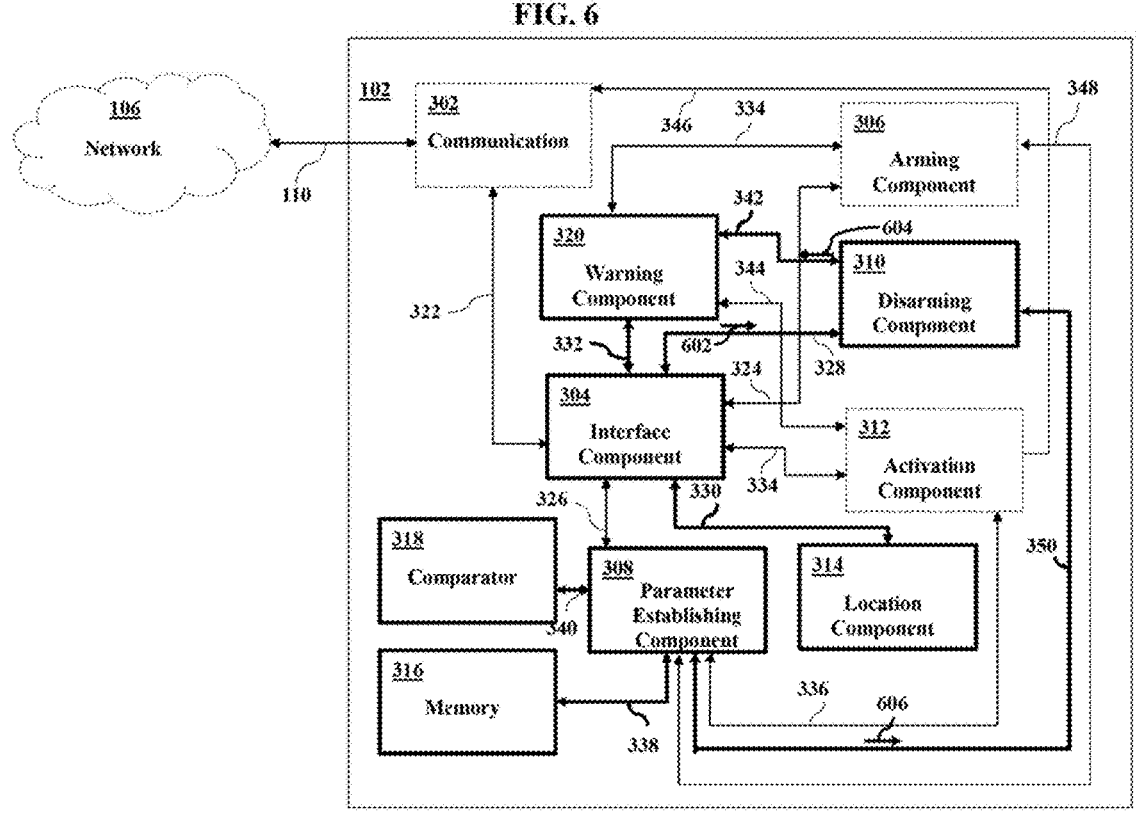

PERSONAL ALARM SYSTEM AND METHOD

TECHNICAL FIELD

Various embodiments described herein relate generally to methods and apparatus utilizing the output of sensors and other functionality embedded in smartphones and, more particularly, to methods and apparatus for providing a personal alarm.

BACKGROUND

People want to feel safe. When feeling safe is not an option, people would be comforted to know that help would be quickly at hand if needed. Unfortunately there are many situations where people feel unsafe, such as traveling late at night, on foot, through a high crime-rate part of town.

Although many people now have smartphones, wherein emergency services are just a quick wireless phone call away, there might be situations where there is no opportunity to make such a call.

Accordingly, for at least the foregoing reasons there exists a need to provide an improved method and system to autonomously warn others that the user of a smartphone is in danger.

SUMMARY

The present invention provides an improved method and system to autonomously warn others that the user or a smartphone is in danger.

Various embodiments described herein are drawn to a communication device that includes an arming component that can generates an arming signal based on arming activation at an arming time, an activation component that can generate an activation signal based on an activation at an activation time, a parameter establishing component that can establish a safety parameter and can generate a safety signal based on a determination of the safety parameter, a communication component that can transmit a data communication, and a disarming component that can generate a disarming signal based on a disarming activation at a disarming time. The communication component can transmit the data communication based on the safety signal. The communication component can transmit the data communication based on the activation signal. The communication component can prevent transmission of the data communication based on the disarming signal.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings:

FIG. 3A illustrates an example embodiment of a smartphone in accordance with aspects of the present invention;

FIG. 6 illustrates the example embodiment of a smartphone of FIG. 3A, wherein the components involved in disarming are highlighted;

DETAILED DESCRIPTION

Figure 1:
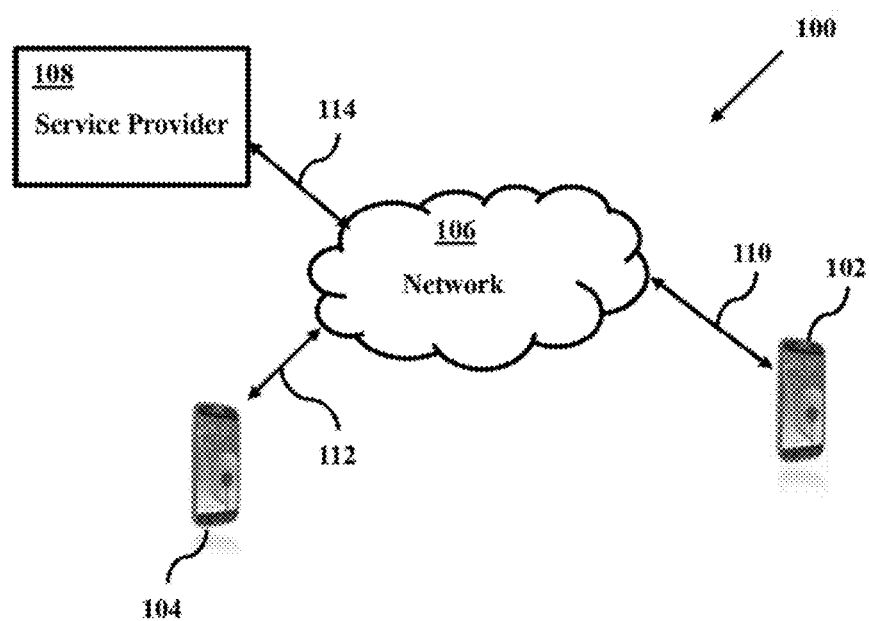
FIG. 1 illustrates a smartphone alarm system in accordance with aspects of the present invention.

Aspects of the present invention are drawn to an alarm system in a smartphone and method for arming, activating and disarming the alarm system.

As used herein, the term "smartphone" is a communication device that includes cellular and/or satellite radiotelephone(s) with or without a display (text/graphical); Personal Communications System (PCS) terminal(s) that may combine a radiotelephone with data processing, facsimile and/or data communications capabilities; Personal Digital Assistant(s) (PDA) or other devices that can include a radio frequency transceiver and a pager, Internet/Intranet access, Web browser, organizer, calendar and/or a global positioning system (GPS) receiver; and/or conventional laptop (notebook) and/or palmtop (netbook) computer(s), tablet(s), or other appliance(s), which include a radio frequency transceiver. As used herein, the term "smartphone" also includes any other radiating user device that may have time-varying or fixed geographic coordinates and/or may be portable, transportable, installed in a vehicle (aeronautical, maritime, or land-based) and/or situated and/or configured to operate locally and/or in a distributed fashion over one or more location(s).

In accordance with aspects of the present invention a user of a smartphone may arm the smartphone when they do not feel safe, or they predict they will be in a position that is not safe. For example, they are at a dark street corner in a crime-ridden part of a city, of if they will be leaving a party or work to walk through a crime-ridden part of the city. Because the smartphone is armed, it is very easy for the user to activate an alarm if something bad were to happen. For example, they may easily triple-tap the phone to activate the alarm. Once activated, the smartphone may contact safety providers, such as the police, fire departments or a call center to provide immediate response to the location of the user.

In accordance with an aspect of the present invention, an alarm m a user's smartphone may be armed. in some embodiments the user may arm the smartphone, for example by tapping a button on the user interface of the smartphone. In some embodiments, the smartphone autonomously arms the alarm based on detected parameters. For example, the detected parameters may be the time of day and the location of the smartphone, e.g., place of business at 5:30 pm during the work week which would indicate that the user will be leaving the office to walk to his car.

In accordance with another aspect of the present invention, an alarm may be easily activated. In an example embodiment, the alarm is activated by a simple action by the user. Non-limiting examples of simple actions by the user to activate the alarm includes triple tapping the smartphone or shaking the smartphone in a predetermined manner. As such, the user may easily activate an alarm to let others know that the user is in danger. The alarm may instruct a service provider that the user is in danger and let the service provider know the user's location so that emergency services may be immediately dispatched to the user.

In accordance with another aspect of the present invention, an alarm may be disarmed. In an example embodiment, the alarm is actively disarmed by the user performing some action, a non-limiting example of which includes tapping a DISARM button on the user interface of the smartphone. In another example embodiment, the alarm is passively disarmed when disarming parameters are met, non-limiting examples of which include traveling a predetermined distance over a predetermined time and reaching a predetermined destination.

In accordance with another aspect of the present invention, a warning may alert the user that the alarm will activate in a predetermined time. In this manner, if the user does not want the alarm to activate, he will have warning of the impending activation at a sufficient time prior to the activation so that he may disarm the alarm. In this manner, false alarms will be greatly reduced.

Non-limiting example embodiments of a smartphone alarm system in accordance with aspects of the present invention will now be described with reference to FIGS. 1-9B.

FIG. 1 illustrates a smartphone alarm system 100 in accordance with aspects of the present invention.

As shown in the figure, system 100 includes a plurality of smartphones, a sample of which are indicated as smartphone 102 and smartphone 104, a network 106 and a service provider 108.

Smartphone 102 is arranged to communicate with network 106 via a communication channel 110. Smartphone 104 is arranged to communicate with network 106 via a communication channel 112 and service provider 108 is arranged to communicate with network 106 via a communication channel 114.

Network 106 may include various communication networks, such as a data network and a wireless network, which can support telephony services for a mobile terminal to communicate over a telephony network (e.g., Public Switched Telephone Network (PSTN)). For the purpose of illustration, network 106 can include a radio network that supports a number of wireless terminals, which may be fixed or mobile, using various radio access technologies. According to one exemplary embodiment, radio technologies that can be contemplated include: first generation (1G) technologies (e.g., advanced mobile phone system (AMPS), cellular digital packet data (CDPD), etc.), second generation (2G) technologies (e.g., global system for mobile communications (GSM), interim standard 95 (IS-95), etc.), third generation (3G) technologies (e.g., code division multiple access 2000 (CDMA2000), general packet radio service (GPRS), universal mobile telecommunications system (UMTS), etc.), 4G, LTE, 5G, etc. For instance, various mobile communication standards have been introduced, such as first generation (1G) technologies (e.g., advanced mobile phone system (AMPS), cellular digital packet data (CDPD), etc.), second generation (2G) technologies (e.g., global system for mobile communications (GSM), interim standard 95 (IS-95), etc.), third generation (3G) technologies (e.g., code division multiple access 2000 (CDMA2000), general packet radio service (GPRS), universal mobile telecommunications system (UMTS), etc.), and beyond 3G technologies (e.g., third generation partnership project (3GPP) long term evolution (3GPP LTE), 3GPP2 universal mobile broadband (3GPP2 UMB), etc.).

Figure 2:
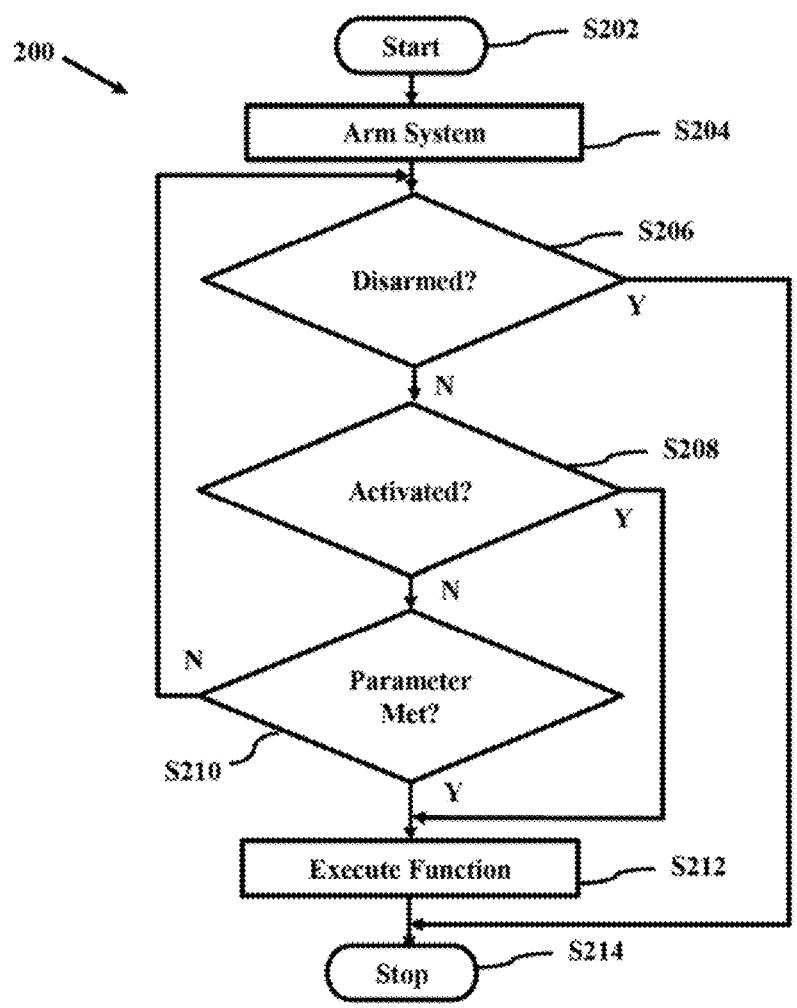
FIG. 2 illustrates an alarm method in accordance with aspects of the present invention.

FIG. 2 illustrates an alarm method 200 in accordance with aspects of the present invention.

As shown in the figure, method 200 starts (S202) and the system is armed (S204). Example embodiments of arming a smartphone alarm in accordance with aspects of the present invention will be described in greater detail with reference to FIGS. 3A-5.

FIG. 3A illustrates an example embodiment of smartphone 102 in accordance with aspects of the present invention.

As shown in the figure, smartphone 102 includes a communication component 302, an interface component 304, an arming component 306, a parameter establishing component 308, a disarming component 310, an activation component 312, a location component 314, a memory 316, a comparator 318 and a warning component 320.

In this example, communication component 302, interface component 304, arming component 306, parameter establishing component 308, disarming component 310, activation component 312, location component 314, memory 316, comparator 318 and warning component 320 are illustrated as individual devices. However, in some embodiments, at least two of communication component 302, interface component 304, arming component 306, parameter establishing component 308, disarming component 310, activation component 312, location component 314, memory 316, comparator 318 and warning component 320 may be combined as a unitary device. Further, in some embodiments, at least one of communication component 302, interlace component 304, arming component 306, parameter establishing component 308, disarming component 310 activation component 312, location component 314, memory 316, comparator 318 and warning component 320 may be implemented as a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Communication component 302 is arranged to communicate with network 106 via communication channel 110 and to communicate with interface component 304 via a communication line 322.

Communication component 302 may be any device or system that is able to communicate with network 106 over communication channel 110. Communication component 302 is able to transmit a voice communication and a data communication to network 106. As will be described in greater detail below, wherein communication component 302 is able to transmit the data communication based on a safety signal, is able to transmit the data communication based on an activation signal, and is able to prevent transmission of the data communication based on a disarming signal.

Interface component 304 is further arranged to communicate with arming component 306 via a communication line 324, to communicate with parameter establishing component 308 via a communication line 326, to communicate with disarming component 310 via a communication line 328, to communicate with location component 314 via a communication line 330 and to communicate with warning component 320 via a communication line 332.

Interface component 304 may be any device or system that enables a user to interface with smartphone 102. Non-limiting examples of interface component 304 include a graphic user interface (GUI), a touch sensitive panel, a key pad, a joy stick, a speech recognition component, and combinations thereof.

Arming component 306 is further arranged to communicate with warning component via a communication line 334 and to communicate with parameter establishing component 308 via a communication line 348. Arming component 306 may be any device or system that is able to generate an arming signal based on arming activation at an arming time, as will be described in greater detail below.

Parameter establishing component 308 is further arranged to communicate with activation component via a communication line 336, to communicate with memory 316 via a communication line 338, to communicate with comparator 318 via a communication line 340 and to communicate with disarming component 310 via communication line 350. Parameter establishing component 308 may be any device or system that is able to establish a safety parameter and to generate a safety signal based on a determination of the safety parameter, as will be described in greater detail below.

Disarming component 310 is further arranged to communicate with warning component 320 via a communication line 342. Disarming component 310 may be any device or system that is able to generate a disarming signal based on a disarming activation at a disarming time, as will be described in greater detail below.

Activation component 312 is further arranged to communicate with warning component 320 via a communication line 344 and to communicate with communication component 302 via a communication line 346. Activation component 312 may be any device or system that is able to generate an activation signal based on an activation at an activation time, as will be described in greater detail below.

Location component 314 may be any, device or system that is able to generate location data based on a location of smartphone 102. Non-limiting examples of location component 314 includes a global positioning system (GPS) and a Wi-Fi access point location based system.

Memory 316 may be any, device or system that is able to store data.

Comparator 318 may be any device or system that is able to generate an inactive area signal based on effective area parameter data and the a priori parameter data.

Warning component 320 may be any device or system that is able to generate a warning signal a passive warning time period prior to a preset time period and in the absence of a disarming signal, and to generate the warning signal after an active warning time period based on the activation signal, as will be described in greater detail below. The warning signal may be any known type of warning signal, non-limiting examples of which include one of the group consisting of a sound, a message, a vibration, or a combination thereof.

In operation, consider the situation where a user is safe at a location, but will soon leave the safe location and travel through an unsafe area.

Figure 4A:
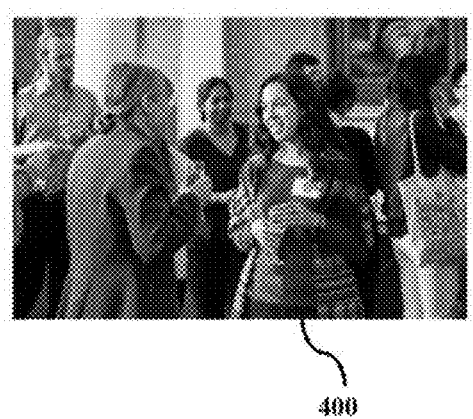
FIG. 4A illustrates a person socializing at a social event.

FIG. 4A illustrates a person 400 socializing at a social event. For purposes of discussion, consider that person 400 is safe while at this social event. Then after some time period, person 400 must leave the social event. Further, person 400 has some concern for their safety after they leave the social event. In accordance with aspects of the present invention, person 400 may use their smartphone as an autonomous alarm system.

Figure 4B:
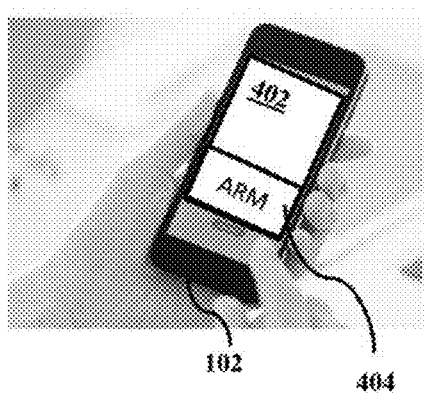
FIG. 4B illustrates the person of FIG. 4A arming a smartphone in accordance with aspects of the present invention.

FIG. 4B illustrates person 400 arming smartphone 102 in accordance with aspects of the present invention.

Figure 3B:
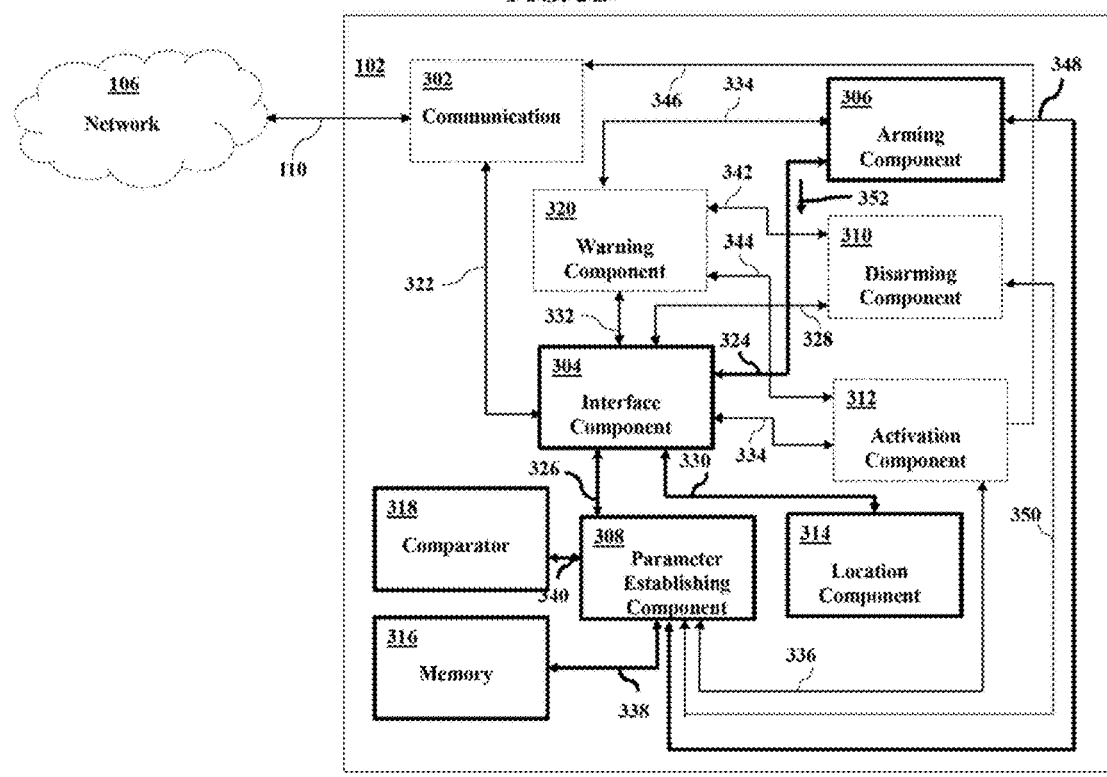
FIG. 3B illustrates the example embodiment of a smartphone of FIG. 3A, wherein the components involved in arming are highlighted.

As shown in the figure, smartphone 102 includes a GUI 402 having an ARM button 404 thereon. In this example, GUI 402 is part of interface component 304 as shown in FIG. 3. When the user taps ARM button 404 on GUI 402, smartphone 102 is armed. This will be described in greater detail with reference to FIG. 3B.

FIG. 38 illustrates, the example embodiment of a smartphone of FIG. 3A, wherein the components involved in arming are highlighted.

As shown in FIG. 3B, a user interacting with interface component 304 as discussed above is but one non-limiting example method of arming smartphone 102. In some example embodiments, interlace component 304 instructs arming component 306 via communication line 324 to arm smartphone 102. Arming component 306 may then arm smartphone 102. In some embodiments arming component 306 may then generate an arming signal 352, which is provided to interface component 304. Interface component 304 may then inform the user that smartphone 102 is armed with a user armed notification of any known kind, non-limiting examples of which include an image, a sound, a vibration or any combination thereof.

In other embodiments, smartphone 102 may autonomously self based on detected parameters.

For example, parameter establishing component 308 may have predetermined parameters stored therein that may be used to determine when to arm smartphone 102. Non-limiting examples of such predetermined parameters used to determine when to arm smartphone 102 include date, time, location, distance, velocity, acceleration, change in acceleration, magnetic fields, electric fields, orientation, sounds, temperature and combinations thereof.

In some embodiments, parameter establishing component 308 may store a priori conditional arming data into memory 316 via communication line 338, wherein the a priori conditional arming data is associated with a condition where a user would want to arm smartphone 102.

In one example, the a priori conditional arming data includes location data. For example, a specific location for which the user may travel on foot daily from a place of work may have an increased violent crime rate. Such a location may be determined from location component 314. interface component 304 may enable a user to access the location data associated with this increased violent crime rate location while the user is in the location by way of location component 314 via communication line 330. This location data may then be passed to parameter establishing component 308 for storage into memory 316.

In one example, the a priori conditional arming data includes distance data. For example, user selectable present distances may be available through interface component 304, These preset distances, non-limiting examples of which include 100 m, 500 m and 1 km, may then be passed to parameter establishing component 308 for storage into memory 316.

In one example, the a priori conditional arming data includes a combination of date, time, location, distance, velocity, acceleration, change in acceleration, magnetic fields, electric fields, orientation, sounds, temperature, For example, parameter establishing component 308 may autonomously determine a location of user based on detected parameters as discussed for example in U.S. Pat. No. 9,333,946 to Sascha Simon, the entire disclosure of which is incorporated herein h reference. Parameter establishing component 308 may further establish that smartphone 102 may need to be armed based on a change in detected parameters. For example, parameter establishing component 308 may: first, autonomously determine that a user is in an office building based on detected parameters as discussed for example in U.S. patent application Ser. No. 14/105,934 to Sascha Simon, the entire disclosure of which is incorporated herein by reference; second, autonomously determine that the user is leaving the office building based on detected parameters; and autonomously arm smartphone 102 based on the change in the autonomously detected conditions.

Parameter establishing component 308 may then autonomously detect parameters to determine whether to arm smartphone 102. For example, as disclosed U.S. patent application Ser. No. 14/105,934, parameter establishing component 308 may detect parameters and provide a signature associated with the detected parameters to comparator 318 via communication line 340. Parameter establishing component 308 may retrieve the a priori conditional arming data from memory 316 via communication line 338 and then provide the a priori conditional arming data to comparator 318 via communication line 340.

Comparator 318 may then compare the a priori conditional arming data with the detected parameters to determine whether an arming condition is present.

In yet another aspect of the present invention parameter establishing component may determine autonomously determine whether to arm smartphone 102 based on a Boolean operation of a combination of parameters. For example, parameter establishing component 308 may be able to autonomously determine, with the aid of memory 316 and comparator 318 as discussed above, a location of smartphone 102 based on a detected parameters. Parameter establishing component 308 may additionally determine a current time and date, by known methods. In a non-limiting example provided merely for purposes of discussion, parameter establishing component 308 may have stored therein, an arming condition based on a Boolean relationship between locate, time and date. For example, parameter establishing component 308 may determine an arming condition when traveling from a recognized (detected) office building to a recognized (detected) parking lot AND the time of day is between 9:00 PM and 6:00 AM AND the day is one of Monday OR Tuesday OR Wednesday OR Thursday OR Friday. If all such Boolean circumstances are true, then parameter establishing component 308 may autonomously arm smartphone 102.

Boolean relationships tor establishing arming conditions may be stored within parameter establishing component 308 by any known system or method, non-limiting examples of which include by way of factory setting or by the user through interface component 304.

Whether by detected parameters alone or by a determined Boolean relationship of detected parameters, parameter establishing component 308 may instruct arming component 306 is communication line 348 to arm smartphone 102. Arming component 306 may then arm smartphone 102. In some embodiments arming component 306 may then generate an arming signal 352, which is provided to interface component 304. Interface component 304 may then inform the user that smartphone 102 is armed with a user armed notification of any known kind, non-limiting examples of which include an image, a sound, a vibration or combination thereof.

Figure 5:
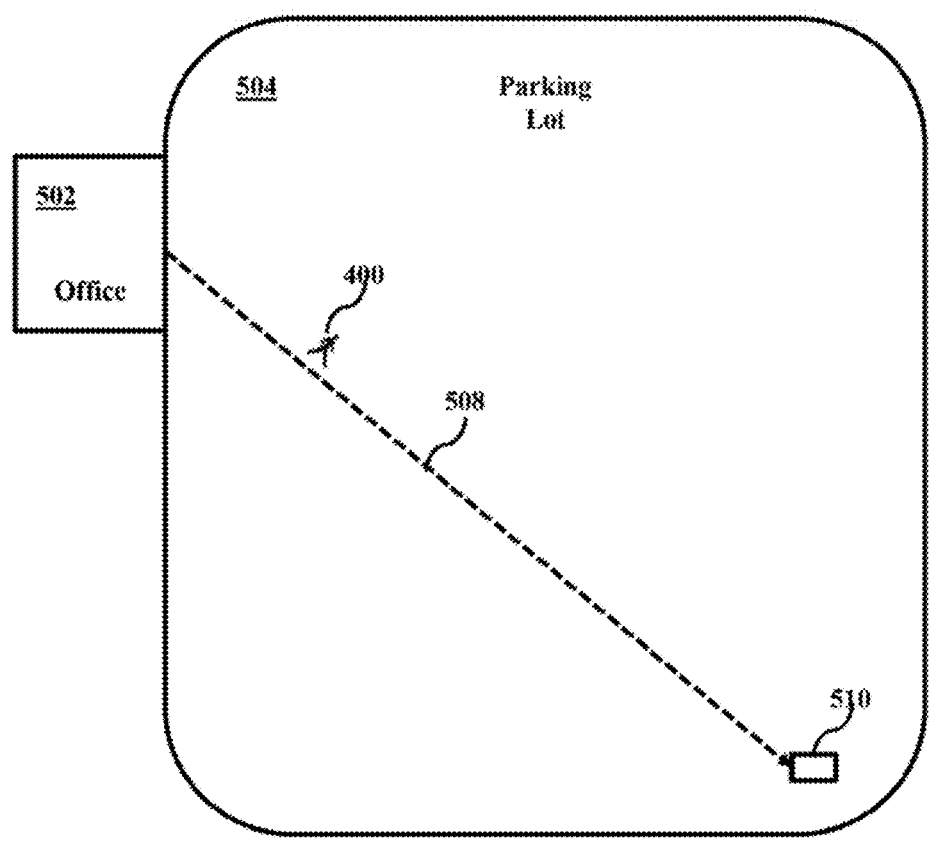
FIG. 5 illustrates the person of FIG. 4A leaving the social event and walking through a parking lot to their car.

FIG. 5 illustrates person 400 leaving the social event from an office building 502 and walking through a parking lot 502 to their car 510. As shown in the figure, person 400 must walk along a path 508 to car 510. For purposes of discussion, let the area along path 508 have a relatively high crime rate, wherein person 400 feels unsafe. In accordance with aspects of the present invention, the smartphone of person 400 would be armed when person 400 leaves office building 502. As such, if person 400 feels threatened along path 508, or if person 400 does not make it to car 510 the alarm may be activated.

Whether autonomously or via by the user, once an arming condition is met, arming component 306 generates an arming signal 352. The time at which arming component 306 is armed is the arming time, $t_{arm}$. In some embodiments, arming component 306 provides arming signal 352 to interface component 304 via communication line 324. Interface component 304 may then provide an armed notification to the riser by any known mechanism, non-limiting examples of which include an image, a sound, a vibration and combinations thereof.

Returning to FIG. 2, after the system is armed (S204), it is determined whether the system is disarmed (S206). Example embodiments of disarming a smartphone alarm in accordance with aspects of the present invention will be described in greater detail with reference to FIGS. 6-7B.

FIG. 6 illustrates the example embodiment of a smartphone of FIG. 3A, wherein the components involved in disarming are highlighted.

As shown in FIG. 6, disarming component 310 may generate a disarming signal based on a disarming activation at a disarming, time.

In operation, consider the situation where a user has left a safe location, has safely passed through a location in which they felt threatened, and has arrived at their destination.

Figure 7A:
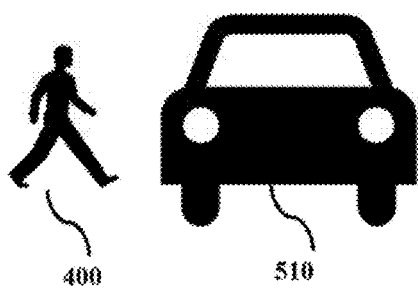
FIG. 7A illustrates the person of FIG. 4A arriving at their car without incident.
Figure 7B:
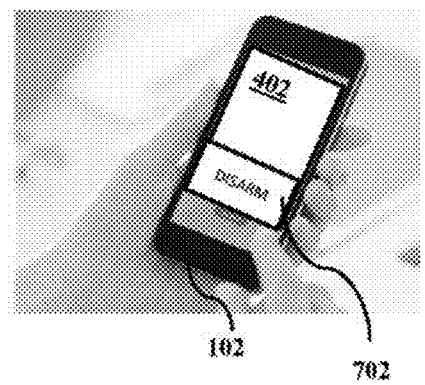
FIG. 7B illustrates the person of FIG. 4A disarming the armed smartphone in accordance with aspects of the present invention.

FIG. 7A illustrates person 400 arriving at car 510 without incident. FIG. 7B illustrates person 400 deactivating smartphone 102 in accordance with aspects of the present invention. As shown in FIG. 7B, smartphone 102 includes GUI 402 having a DISARM button (or other interface) 702 thereon. In this non-limiting example embodiment, person 400 may press DISARM button 702 to disarm an alarm in accordance with aspects of the present invention.

Returning to FIG. 6, when person 400 (not shown) presses DISARM button 702 (not shown) interface component 304 provides a disarm instruction 602 to disarming component 310 via communication line 328. Disarming component 310 then disarms the alarm of smartphone 102.

For example, as shown in FIG. 6, upon receiving disarm instruction 602, disarming, component 310 generates a disarming signal. The time at which disarming component 310 disarms the alarm is the disarming time, $t_{da}$. In some embodiments, disarming component 310 provides a disarming signal 604 to warning component 320 via communication line 342.

In sonic embodiments, warning component 320 may then provide a disarming notification to interface component 304 via communication line 332. Interface component 304 may then inform the user of the imminent disarming of the alarm by any known mechanism, non-limiting examples of which include an image, a sound, a vibration and combinations thereof.

A warning signal provided to interface component from warning component 320 instructs interface component 304 to warn the user that the alarm is about to activate, unless a disarming signal is received. For purposes of discussion, consider the situation in which the alarm will activate in 30 seconds. The user may want to know that the alarm is about to activate. The 30 seconds may be sufficient warning time for the user to determine whether the alarm should or should not be disarmed. If the alarm should be disarmed, the user may do so, thus providing disarming signal 604 to warning component 320. If warning component 320 receives disarming signal 604, then the warning signal may be terminated by warning component 320.

Consider an example embodiment wherein the alarm of smartphone 102 will activate if a person has not reached a set of predetermined safety parameters, e.g., traveled 500 m within 12 minutes. Now further consider that the user of smartphone 102 stops 50 meters short of the required 500 m to speak with a friend. As time goes by while talking with the friend, the user of smartphone 102 may forget that the alarm will activate if he fails to travel the remainder of the 50 meters within the remainder of the 12 minutes. In such a case, smartphone 102 may provide a warning to the user that the alarm will activate. The time period prior to the activation of the alarm (for which the warning may be provided to the user) is a passive warning time period. Accordingly, in some embodiments, after receiving disarming signal 604, warning component may generate the warning signal for interface component 304. Interface component 304 may then provide the warning for the 30 seconds. In some embodiments, interface component may provide the warning with information related to the passive warning time period. For example, if the passive warning time period is 30 second (30 seconds until the alarm is disarmed), the warning provided to the user may include an image counting down the 30 seconds, or a rapidly increasing beeping sound that culminates after 30 seconds. In this manner, the user of smartphone 102 may disarm the alarm if desired.

Returning to FIG. 2, if it is determined that the system has been disarmed (Y at S206), then method 200 stops (S214). Alternatively, if it is determined that the system has not been disarmed (N tat S206), then it is determined whether the alarm has been activated (S208). Example embodiments of activating a smartphone alarm in accordance with aspects of the present invention will be described in greater detail with reference to FIGS. 8-9B.

Figure 8:
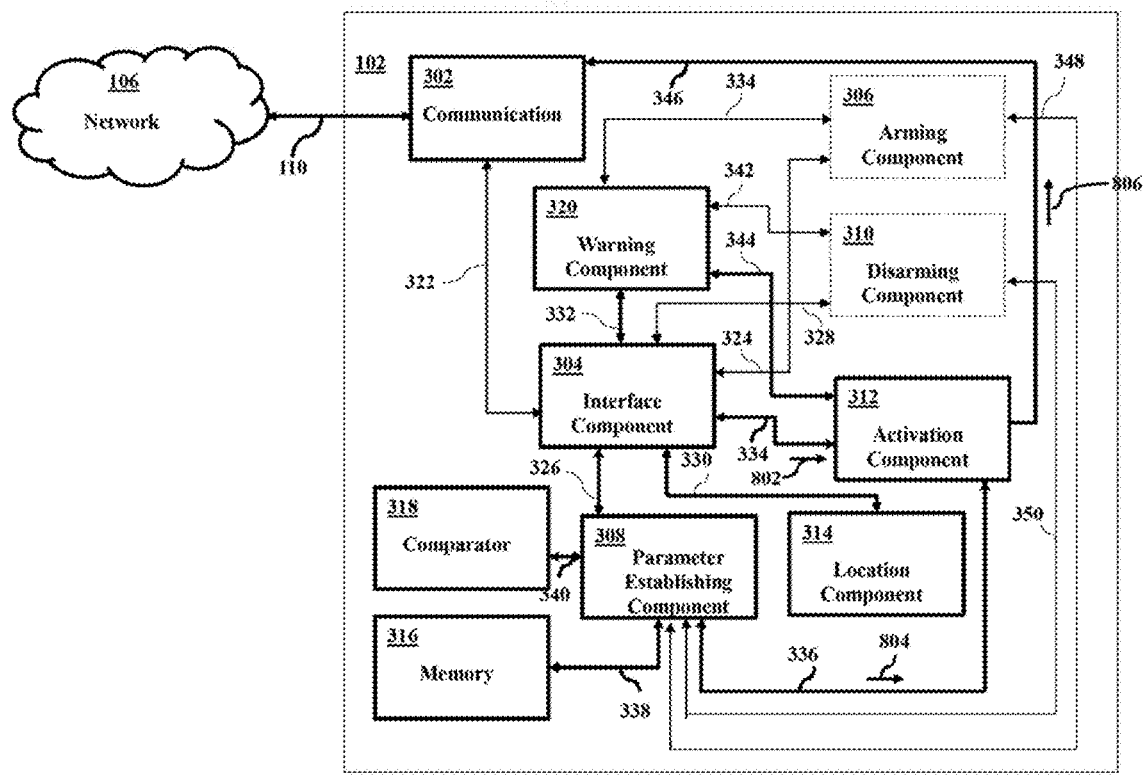
FIG. 8 illustrates the example embodiment of a smartphone of FIG. 3A, wherein the components involved in activating are highlighted.

FIG. 8 illustrates example embodiment of smartphone 102 of FIG. 3, wherein the components involved in activating smartphone 102 are highlighted.

As shown in FIG. 8, activation component 312 may generate an activation signal based on an activation at an activation time.

In operation, consider the situation where a user has left a safe location, and now is in a situation in which they are threatened. For example, returning to FIG. 5, consider the situation where person 400 has left office building 502 and is in route to their care 510 along path 508 through parking lot 504. Now further consider that before person 400 reaches car 510, they are robbed in parking lot 504.

Figure 9A:
FIG. 9A illustrates the person of FIG. 4A being robbed at gunpoint.

FIG. 9A illustrates person 400 being robbed by a robber 900 at gunpoint. Person 400 might be too frightened to perform actions that are too complicated in the face of impending danger. In accordance with aspects of the present invention, activating smartphone 102 may be easily performed by the user in some embodiments, and in some embodiments, may be performed autonomously.

Figure 9B:
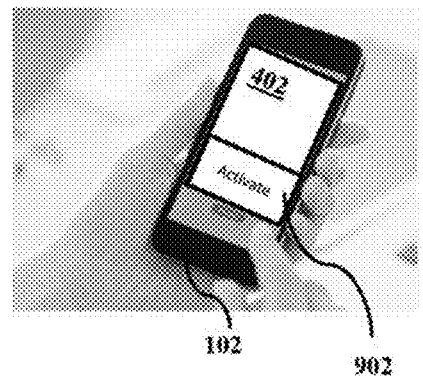
FIG. 9B illustrates the person of FIG. 4A activating the armed smartphone in accordance with aspects of the present invention.

FIG. 9B illustrates person 400 activating smartphone 102 in accordance with aspects of the present invention. As shown in the figure, smartphone 192 includes GUI 402, which at this point includes an ACTIVATE button 902 thereon. In this non-limiting example embodiment, person 400 may press ACTIVATE button 902 to activate an alarm in accordance with aspects of the present invention.

Returning to FIG. 8, when person 400 (not shown) presses ACTIVATE button 902 (not shown) interface component 304 provides an activation instruction 802 to activation component 312 via communication line 334. Activation component 312 then generates an activation signal 806, which is then provided to communication component 302.

It should be noted, as mention above, that there will be circumstances where person 400 may be unable to press ACTIVATE button 902. For example, person 400 may be too frightened to act accordingly, or may be instructed by an attacker to "Don't Move!!"In accordance with other embodiments, a user may be able to activate the alarm of smartphone 102 in more subtle ways.

In other embodiments, the alarm of smartphone 102 may be activated, based on detected parameters.

For example, parameter establishing component 308 may have predetermined parameters stored therein that may be used to determine when to activate smartphone 102. Non-limiting examples of such predetermined parameters used to determine when to activate smartphone 102 include date, time, location, distance, velocity, acceleration, change in acceleration, magnetic fields, electric fields, orientation, sounds, temperature, or Combinations thereof.

In some embodiments, parameter establishing component 308 may store a priori activation data into memory 316 via communication line 338, Wherein the a priori activation data is associated with a condition where a user would want to activate smartphone 102.

In one example, the a priori activation data includes series of taps, such as a triple tap on smartphone 102. Parameter establishing component 308 may include an accelerometer that is able to detect taps on smartphone 102. The accelerometer may generate an acceleration signal based on the detected acceleration, which in this non-limiting example embodiment is a result of the taps. For example, a series of taps that may be used in the future to activate the alarm of smartphone 102 will create a particular acceleration signature, which may then be stored in memory 316. A future similar series of taps may then be detected by parameter establishing component 308 to generate an acceleration signal. The generated acceleration signal will then be compared with the stored acceleration signature by comparator 318 to determine whether the series of taps are a recognized activation.

In another non-limiting example, the a priori conditional arming data includes series of shakes of smartphone 102. Parameter establishing component 308 may include an accelerometer that is able to detect shakes of smartphone 102. For example, a series of shakes that may be used in the future to activate the alarm of smartphone 102 will create a particular acceleration signature, which may then be stored in memory 316. A future similar series of shakes may then be detected by parameter establishing component 308 to generate an acceleration signal. The generated acceleration signal will then be compared with the stored acceleration signature by comparator 318 to determine whether the series of shakes are a recognized activation.

In another non-limiting example, the a priori conditional arming data includes a shout by the user, such as a shout "Somebody Help Me!" Parameter establishing component 308 may include a microphone that is able to detect the sound. For example, a shout that may be used in the future to activate the alarm of smartphone 102 will create a particular sound signature, which may then be stored in memory 316. A future shout may then be detected by parameter establishing component 308 to generate a sound signal. The generated sound signal will then be compared with the stored sound signature by comparator 318 to determine whether the shout is a recognized activation.

Parameter establishing component 308 may detect activation parameters in a manner as discussed for example in U.S. patent application Ser. No. 14/105,934. Parameter establishing component 308 may further establish that the alarm of smartphone 102 may need to be activate based on the detected activation parameters. For example, as disclosed U.S. patent application Ser. No. 14/105,934, parameter establishing component 308 may detect activation parameters and provide a signature associated with the detected activation parameters to comparator 318 via communication line 340. Parameter establishing component 308 may retrieve the a priori activation data from memory 316 via communication line 338 and then provide the a priori activation data to comparator 318 via communication line 340.

Comparator 318 may then compare the a priori activation data with the detected activation parameters to determine whether an activation condition is present.

Comparator 318 provides a comparison signal to parameter establishing component 308 based the comparison of a priori activation data and the detected activation parameters. This comparison signal may include a probability threshold as described in U.S. patent application Ser. No. 14/105,934, the entire disclosure of which is incorporated herein by reference. As such, a probability threshold may be set to decrease the likelihood of a false positive recognition of an activation parameter.

In some embodiments, comparator 318 provides the comparison signal, as an activation signal based on the comparison of an a priori acceleration signature and the detected activation parameters, to parameter establishing component 308. Parameter establishing component 308 then provides this activation signal to activation component 312 via communication line 336 as an activation instruction 804.

Returning to FIG. 2, if the system is activated (Y at S208), then a function is executed (S212).

For example, as shown in FIG. 8, whether autonomously or via by the user, once an activation condition is met, activation component 312 generates an activation signal 806. The time at which activation component 312 activates the alarm is the activation time, $t_{act}$. In some embodiments, activation component 312 provides activation signal 80 to communication component 304 via communication line 346.

In some embodiments, communication component 302 may then provide an activation notification to service provider 108 via communication channel 110, network 106 and communication channel 114, as shown in FIG. 1. The activation notification may be a data signal, including information related to the owner of smartphone 102, the current location of smartphone 102 and a request for emergency assistance.

Smartphone 102 may provide a transmission, by way of communication component 302, as a voice transmission or a data transmission. In voice transmissions, the packets of data arrive in order and they have to take the same short time to transmit. In data transmissions, the packets of data may arrive at different times, and are then are appropriately arranged at the receiver end. These differences in the modes of transmission required separate networks to be set up, each being the optimum for the different expectations, but the distinction is not as important any more as it used to be. There may be regulatory issues that prevent smartphone 102 from autonomously transmitting a transmission as a voice call to service provider 108 or smartphone 104. In such situations, communication component 302 may autonomously transmit activation signal 806 as a data transmission.

In cases where activation signal 806 is transmitted to service provider 108, service provider 108 may contact emergency services to provide immediate help to the user of smartphone 102. Similarly, in cases where activation signal 806 is transmitted to smartphone 104, the user of smartphone 104 may contact emergency services to provide immediate help to the user of smartphone 102.

In some embodiments, communication component 302 may additionally provide an activation notification to interface component 304 via communication line 322. Interface component 304 may then inform the user of the alarm activation by any known mechanism, non-limiting examples of which include an image, a sound, a vibration, or combinations thereof.

Of course there will be situations where person 400, as shown in FIG. 5, is able to travel safely to car 510 without incident. In such cases, the armed alarm system of the present invention will not have been activated, either by the user or autonomously.

It should be noted that in the non-limiting example embodiments discussed above, the alarm system of smartphone 102 is able to autonomously activate to warn others, e.g., service provider 108 or the user of smartphone 104 as shown in FIG. 1, of the user of smartphone 102 being in danger from others. It should be noted that in other embodiments, smartphone 102 may be used able to autonomously warn others, e.g., service provider 108 or the user of smartphone 104 as shown in FIG. 1, of the user of smartphone 102 being in danger from accidents. For example, smartphone 104 may autonomously determine that the user has fallen or has been involved in an auto accident. This autonomous accident determination may be performed for example by any known method, a non-limiting example of which includes comparing parameter signatures associated with falling or with auto accidents stored in memory 316 with detected parameter signals detected by parameter establishing component. An example of such autonomous accident determination is disclosed in U.S. patent application Ser. No. 14/105,744 to Sascha Simon, the entire disclosure of which is incorporated herein by reference.

Returning to FIG. 2, if the system is not activated (N at S206), it is determined whether a parameter is met (S208). This will be described with additional reference to FIG. 6.

As discussed above, a user may actively disarm the alarm system (S206). In other embodiments, the alarm of smartphone 102 may be disarmed based on detected parameters.

For example, parameter establishing component 308 may have predetermined parameters stored therein that may be used to determine when to disarm smartphone 102. Non-limiting examples of such predetermined parameters used to determine when to disarm smartphone 102 include date, time, location, distance, velocity, acceleration, change in acceleration, magnetic fields, electric fields, orientation, sounds, temperature, and combinations thereof.

In some embodiments, parameter establishing component 308 may store a priori disarming data into memory 316 via communication line 338, wherein the a priori disarming data is associated with a condition where a user would want to disarm smartphone 102.

In one non-limiting example, the a priori conditional disarming data includes an announcement by the user, such as a shout "Disarm Alarm." Parameter establishing component 308 may include a microphone that is able to detect the sound. For example, an announcement by a user "Disarm Alarm," that may be used in the future to disarm the alarm of smartphone 102 will create a particular sound signature, which may then be stored in memory 316. A future similar detected announcement may then be detected by parameter establishing component 308. This sound signature may then be stored into memory 316.

In another non-limiting example, the a priori conditional disarming data includes a distance traveled from the time the alarm was armed, $t_{arm}$. Parameter establishing component 308 may include a location determining component, or in some embodiments, obtain location data from location component 314 of smartphone 102 at time $t_{arm}$. In some example embodiments, parameter establishing component may include a zone component that is able to generate effective area location data based on an established area of effect. In particular, the zone component may have predetermined conditions of time and distance for which smartphone 102, and thus the user of smartphone 102, must travel. The distance, from the location of smartphone 102 at time $t_{arm}$, to which the user must travel establishes an area of effect. In other words, the alarm will activate if the user fails to leave this effective area within the predetermined time.

Further, if the user leaves the effective area within the predetermined time, then smartphone will be outside the effective area. In some embodiments, parameter establishing component may generate disarming instruction 606 as an inactive area signal, indicating that the alarm should be disarmed. Upon receiving such an inactive area signal, disarming component 310 may disarm the alarm.

For example, a distance may be 500 m within 10 minutes. If smartphone 102 travels a distance of 500 m within 10 minutes of $t_{arm}$, then the conditions for disarming the alarm will have been met. Such conditions would indicate a likelihood that the user has safely reached a destination, thus the alarm may be disarmed. Alternatively, if smartphone 102 fails to travel the prescribed distance of 500 m within the prescribed 10 minutes of $t_{arm}$, then the conditions for disarming the alarm will not have been met. Such conditions would indicate a possibility that the user has not safely reached a destination.

Parameter establishing component 308 may detect disarming parameters. Parameter establishing component 308 may further establish that the alarm of smartphone 102 may need to be disarmed based on the detected activation parameters. For example, parameter establishing component 308 may detect disarming parameters and provide a signature associated with the detected disarming parameters to comparator 318 via communication line 340. Parameter establishing component 308 may retrieve the a priori disarming data from memory 316 via communication line 338 and then provide the a priori disarming data to comparator 318 via communication line 340.

Comparator 318 may then compare the a prior disarming data with the detected disarming parameters to determine whether a disarming condition is present.

Comparator 318 provides a comparison signal to parameter establishing component 308 based the comparison of a priori disarming data and the detected disarming parameters. This comparison signal may include a probability threshold as described in U.S. patent application Ser. No. 14/095,156 to Sascha Simon, the entire disclosure of Which is incorporated herein by reference. As such, a probability threshold may be set to decrease the likelihood of a false positive recognition of a disarming parameter.

In some embodiments, comparator 318 provides the comparison signal, as a disarming signal based on the comparison of an a priori announcement signature and the detected disarming parameters, to parameter establishing component 308. Parameter establishing component 308 then provides this disarming signal to disarming component 310 via communication line 350 as a disarming instruction 606.

For example, as shown in FIG. 6, whether autonomously or via by the user, once a disarming condition is met, disarming component 310 generates a disarming signal. The time at which disarming component 310 disarms the alarm is the disarming time, $t_{da}$. In some embodiments, disarming component 310 provides a disarming signal 604 to warning component 320 via communication line 342.

In some embodiments, warning component 320 may then provide a disarming notification to interface component 304 via communication line 332. Interface component 304 may then inform the user of the imminent disarming of the alarm by any known mechanism, non-limiting examples of which include an image, a sound, a vibration and combinations thereof.

Returning to FIG. 2, if the parameter is not met (N at S210), method 600 continues until the system is disarmed (Y at S206), the system is activated (Y at S208) or the parameter is met (Y at S210), lithe system is disarmed (Y at S206), the system is activated (Y at S208) or the parameter is met (Y at S210), method 600 stops (S214).

It should be noted that in non-limiting example method 600, the determining as to whether smartphone 102 is disarmed (S206), the determining as to whether smartphone 102 is activated (S208) and the determining as to whether parameters have been met (S210) are performed serially. However, in some embodiments, these determinations may be performed in different orders. Further, in some embodiments, these determinations may be performed in parallel.

Unfortunately there are many situations where people feel unsafe, such as traveling late at night, on foot, through a high crime-rate part of town. Further, although many people now have smartphones, wherein emergency services are just a quick wireless phone call away, there might be situations where there is no opportunity to make such a call.

Aspects of the present invention provide a method and system to autonomously warn others that the user of a smartphone is in danger.

A smartphone is able to first arm the alarm system, either by active action of the user or by passive detection of arming parameters. Then the alarm may be activated, either actively by action of the user or passively when disarming parameters are not met. Finally, the alarm may be disarmed, either actively by action of the user or passively when disarming parameters are met.

With a smartphone in accordance with aspects of the present invention, a smartphone may easily and quickly call for assistance even in situations where the user would not be able to make such a call.

In the drawings and specification, there have been disclosed embodiments of the invention and, although specific terms are employed, they are used in a generic and descriptive sense only and not for purposes of limitation, the scope of the invention being set forth in the following claims.

What is claimed as new and desired to be protected by Letters Patent of the United States is:

1. A communication device comprising:
    an arming component operable to generate an arming signal based on arming activation at an arming time;
    an activation component operable to generate an activation signal based on an activation at an activation time;
    a parameter establishing component operable establish a safety parameter and to generate a safety signal based on a determination of the safety parameter;
    a communication component operable to transmit a data communication;
    a disarming component operable to generate a disarming, signal based on a disarming activation at a disarming time;
    a memory having a parameter signature stored therein; and
    a comparator,
    wherein said communication component is operable to transmit the data communication based on the safety signal,
    wherein said communication component is operable to transmit the data communication based on the activation signal,
    wherein said communication component is operable to prevent transmission of the data, communication based on the disarming signal,
    wherein said parameter establishing component is operable to generate a second parameter signature based on a detected parameter,
    wherein said comparator is operable to generate the activation signal based on a comparison of the second parameter signature and the parameter signature, and
    wherein the detected parameter comprises at least one of a sound and an acceleration.

2. The communication device of claim 1, further comprising a location component operable to generate location data based on a location of the communication device.

3. The communication device of claim 2, further comprising:
    a zone component operable to generate effective area location data based on an established area of effect; and
    a comparator operable to generate an inactive area signal based on the effective area location data and the location data,
    wherein said communication component is operable to transmit the data communication after the time period in the absence of the disarming signal and in further absence of the inactive area signal.

4. The communication device of claim 1, wherein said activation component is operable to generate the activation signal based on a triple tap of the communication device by a user.

5. The communication device of claim 1, further comprising:
    wherein said activation component comprises an accelerometer operable to generate an acceleration signal based on a detected acceleration,
    wherein said comparator is operable to generate the activation signal based on a comparison of the acceleration signature and the acceleration signal.

6. The communication device of claim 1, further comprising:
    a warning component operable to generate a warning signal a passive warning time period prior to the time period and in the absence of the disarming signal, and to generate the warning signal after an active warning time period based on the activation signal,
    wherein the warning signal comprises one of the group consisting of a sound, a vibration and a combination thereof.

7. A method communicating with a receiving device, said method comprising;
    generating, via an arming component, an arming signal upon arming activation at an arming time;
    enabling, via an activation component, the generation of an activation signal based on an activation at an activation time;
    establishing, via a parameter establishing component, a safety parameter;
    generating, via the parameter establishing component, a safety signal based on a determination of the safety parameter;
    enabling, via a disarming component, the generation of a disarming signal based on a disarming activation at a disarming time;
    storing a parameter signature into a memory;
    transmitting, via a communication component, a predetermined data communication to the receiving device after a time period when the disarming signal is not generated;
    transmitting, via the communication component, the predetermined data communication to the receiving device when the activation signal is generated;
    preventing, via said communication component, transmission of the predetermined data communication to the receiving device when the disarming signal is generated;
    generating, via the parameter establishing component, a second parameter signature based on a detected parameter; and
    generating, via a comparator, the activation signal based on a comparison of the second parameter signature and the parameter signature,
    wherein the detected parameter comprises at least one of a sound and an acceleration.

8. The method of claim 7, further comprising generating, via a location component, location data based on a location of the communication device.

9. The method of claim 8, further comprising:
    generating, via a zone component, effective area location data based on an established area of effect; and
    generating, via the comparator, an inactive area signal based on the effective area location data and the location data,
    wherein said transmitting, via said communication component, a predetermined data communication to the receiving device after the time period when the disarming signal is not generated comprises transmitting, via the communication component, the predetermined data communication to the receiving device after the time period when the disarming signal is not generated when the inactive area signal is not generated.

10. The method of claim 7, wherein said enabling, via said activation component, the generation of said activation signal based on the activation at the activation time comprises enabling the generation of the activation signal based on a triple tap by a user.

11. The method of claim 7, further comprising:
storing, into the memory, an acceleration signature;
wherein said enabling, via said activation component, the generation of said activation signal based on the activation at the activation time comprises enabling an accelerometer to generate an acceleration signal based on a detected acceleration, and
wherein said wherein said enabling, via the activation component, the generation of the activation signal based on the activation at the activation time further comprises generating, via the comparator, the activation signal based on a comparison of the acceleration signature and the acceleration signal.

12. The method of claim 7, further comprising:
enabling, via a warning component, generation of a warning signal a predetermined passive warning time period prior to the time period and in the absence of the disarming signal; and
enabling, via the warning component, generation of the warning signal after an active warning time period based on the activation signal,
wherein the warning signal comprises one of the group consisting of a sound, a vibration and a combination thereof.

13. A non-transitory, tangible, computer-readable media having computer-readable instructions stored thereon, the computer-readable instructions being capable of being read by a computer and being capable of instructing the computer to perform the method comprising:
generating, via an arming component, an arming signal upon arming activation at an aiming time;
enabling, via an activation component, the generation of an activation signal based on an activation at an activation time;
establishing, via a parameter establishing component, a safety parameter;
generating, via the parameter establishing component, a safety signal based on a determination of the safety parameter;
enabling, via a disarming component, the generation of a disarming signal based on a disarming activation at a disarming time;
storing a parameter signature into a memory;
transmitting, via a communication component, a predetermined data communication to a receiving device after a time period when the disarming signal is not generated;
transmitting, via the communication component, the predetermined data communication to a receiving device when the activation signal is generated;
preventing, via said communication component, transmission of the predetermined data communication to the receiving device when the disarming signal is generated;
generating, via the parameter establishing component, a second parameter signature based on a detected parameter; and
generating, via a comparator, the activation signal based on a comparison of the second parameter signature and the parameter signature,
wherein the detected parameter comprises at least one of a sound and an acceleration.

14. The non-transitory, tangible, computer-readable media of claim 13, the computer-readable instructions being capable of being read by said computer and being capable of instructing the computer to perform the method further comprising generating, via a location component, location data based on a location of the communication device.

15. The non-transitory, tangible, computer-readable media of claim 14, the computer-readable instructions being capable of being read by said computer and being capable of instructing the computer to perform the method further comprising:
generating, via a zone component, effective area location data based on an established area of effect; and
generating, via the comparator, an inactive area signal based on the effective area location data and the location data,
wherein said transmitting, via said communication component, a predetermined data communication to the receiving device after the time period when the disarming signal is not generated comprises transmitting, via the communication component, the predetermined data communication to the receiving device after the time period when the disarming signal is not generated when the inactive area signal is not generated.

16. The non-transitory, tangible, computer-readable media of claim 13, wherein the computer-readable instructions are capable of instructing the computer to perform the method such that said enabling, via said activation component, the generation of said activation signal based on the activation at the activation time comprises enabling the generation of the activation signal based on a triple tap by a user.

17. The non-transitory, tangible, computer-readable media of claim 13, the computer-readable instructions being capable of being read by said computer and being capable of instructing the computer to perform the method further comprising:
storing, into the memory, an acceleration signature;
wherein said enabling, via said activation component, the generation of the activation signal based on the activation at the activation time comprises enabling an accelerometer to generate an acceleration signal based on a detected acceleration, and
wherein said wherein said enabling, via the activation component, the generation of the activation signal based on the activation at the activation time further comprises generating, via the comparator, the activation signal based on a comparison of the acceleration signature and the acceleration signal.

18. The non-transitory, tangible, computer-readable media of claim 13, the computer-readable instructions being capable of being read by said computer and being capable of instructing the computer to perform the method further comprising;
enabling, via a warning component, generation of a warning signal a predetermined passive warning time period prior to the time period and in the absence of the disarming signal; and
enabling, via the warning component, generation of the warning signal after an active warning time period based on the activation signal,
wherein the warning signal comprises one of the group consisting of a sound, a vibration and a combination thereof.

* * * * *